Patented Mar. 24, 1953

2,632,749

UNITED STATES PATENT OFFICE 2,632,749

MANUFACTURE OF ACENAPHTHYLENE RESINS

Morris Kaufman and Alan Fowler Williams, London, England, assignors to C. D. Patents Limited, London, England, a British company No Drawing. Application October 14, 1949, Serial No. 121,462. In Great Britain October 19, 1948

4 Claims. (Cl. 260—31.8)

The present invention is for improvements in or relating to the manufacture of thermoplastic resins which have a high softening point and to the manufacture of moulded articles therefrom.

It will be appreciated that there are many advantages in the ability to mould, by the relatively inexpensive techniques of conventional thermoplastic moulding, articles from resins having a softening point well above that hitherto attainable with thermoplastic resins, and hence with useful applications which hitherto have been limited to thermosetting resins.

The resin which is produced by the polymerization by heat of acenaphthylene softens at about 250° C., but near this temperature changes occur in the polymer which make it very difficult, if not impossible, to obtain a satisfactory moulded product by the application of heat and pressure. Attempts which have been made to lower the softening temperature and hence the moulding temperature by mixing a plasticizer with the polymer prior to moulding have not been successful, chiefly owing to the difficulty of obtaining a homogeneous mixture of polymer and plasticizer.

We have found that moulding is facilitated and that an excellent moulded product can be obtained if a plasticizer for the polymer is added to the monomer prior to polymerization.

The plasticizers suitable for use in this invention are those commonly used with thermoplastic resins, such for example as diphenyl/diphenylene oxide mixture, α-methyl naphthalene, dimethyl naphthalene oil, dibutyl phthalate and tricresylphosphate. The plasticizers may be solid or liquid at room temperature.

According to the present invention, a process for the manufacture of a resin having a high softening point and capable of being moulded by the conventional techniques of plastic moulding comprises the thermal polymerisation of acenaphthylene in bulk form and in the presence of at least one plasticizer as hereinbefore defined.

Varying proportions of plasticizer and monomer may be used. The higher the percentage of plasticizer the longer the time necessary, as a general rule, for polymerization to take place.

For the manufacture of moulded articles, according to this invention, a resin which has been made by the process above-described is powdered and the powder is subjected to heat and pressure by any of the techniques customarily used for the moulding of plastic resins.

The following is a description by way of example of one method of making a plasticized resin in accordance with the present invention and one method of moulding such a plasticized resin. All parts are parts by weight.

Example 1

10 parts of acenaphthylene and 2 parts of dimethyl naphthalene (plasticizer) are placed in a sealed vessel and heated to 150° C. this temperature being maintained for 24 hours. The product is a translucent dark resin.

Example 2

100 parts by weight of acenaphthylene are mixed with 25 parts of redistilled dimethylnaphthalene oil and are polymerised in a sealed tube at 125° C. for 24 hours. At the end of this time the polymer is ground for moulding purposes. The softening point of this product is 173° C. (British Standard Test 1493/48).

Example 3

100 parts by weight of acenaphthylene are mixed with 15 parts by weight of dibutyl phthalate and heated under reflux conditions for 24 hours at 125°. The softening point of this product is 192° C. (British Standard Test 1493/48).

Example 4

100 parts by weight of acenaphthylene and 25 parts by weight of dibutyl phthalate were polymerised at 125° C. for 24 hours, and this gave a less brittle more easily worked material than that of Example 2. The softening point was 159° C.

We claim:

1. A process for the manufacture of a resin having a high softening point and capable of being moulded which process comprises mixing acenaphthylene in bulk form with 15 to 25% of the mixture of a plasticizer therefor selected from the group consisting of dimethyl naphthalene, and dibutyl phthalate and subjecting the mixture to thermal polymerization at about 125° to 150° C.

2. A process as claimed in claim 1, wherein the plasticizer is dimethyl naphthalene.

3. A process as claimed in claim 1, wherein the plasticizer is re-distilled dimethyl naphthalene oil.

4. A process as claimed in claim 1, wherein the plasticizer is dibutyl phthalate.

MORRIS KAUFMAN.
ALAN FOWLER WILLIAMS.

REFERENCES CITED

The following references are of record in the file of this patent:

UNITED STATES PATENTS

| Number    | Name         | Date          |
|-----------|--------------|---------------|
| 2,071,932 | Macht        | Feb. 23, 1937 |
| 2,365,646 | New et al.   | Dec. 19, 1944 |
| 2,445,181 | Miller et al.| July 13, 1948 |

OTHER REFERENCES

Jones, article in British Plastics, July 1946, pages 286–289.